Figure 2:
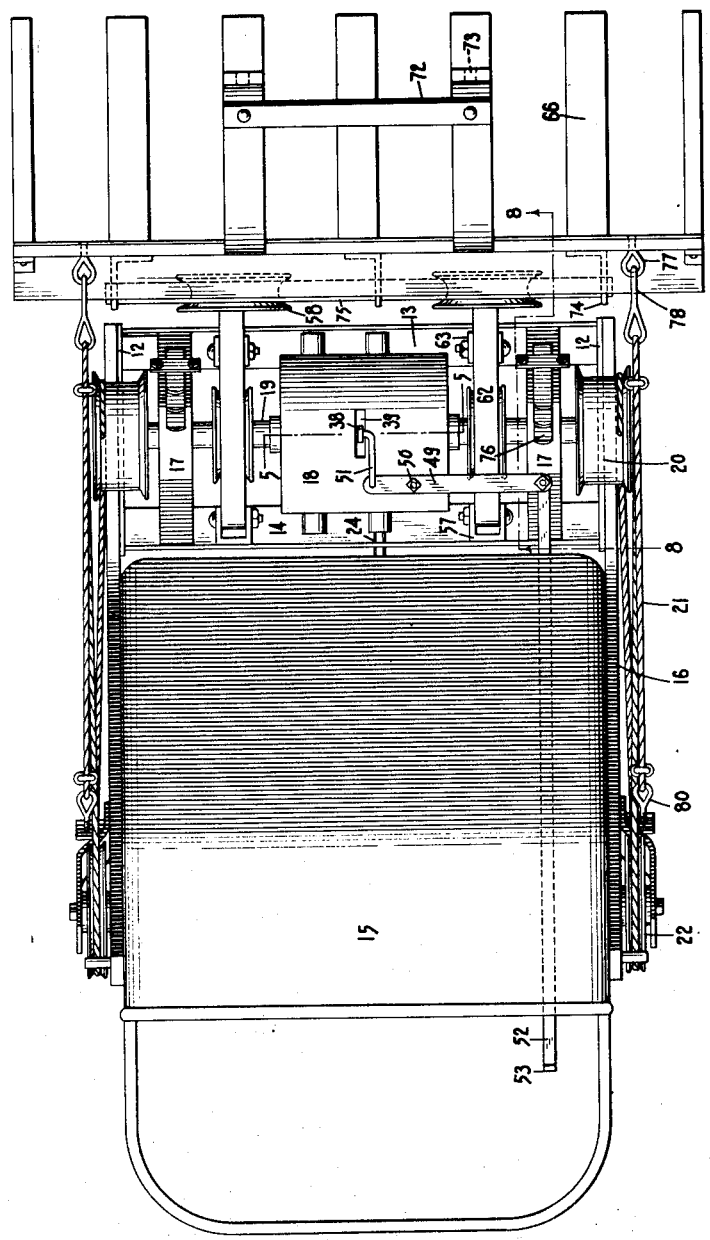

March 15, 1932.  R. A. FONTAINE  1,849,424
BRICK HANDLING TRUCK
Filed April 15, 1929  4 Sheets-Sheet 1
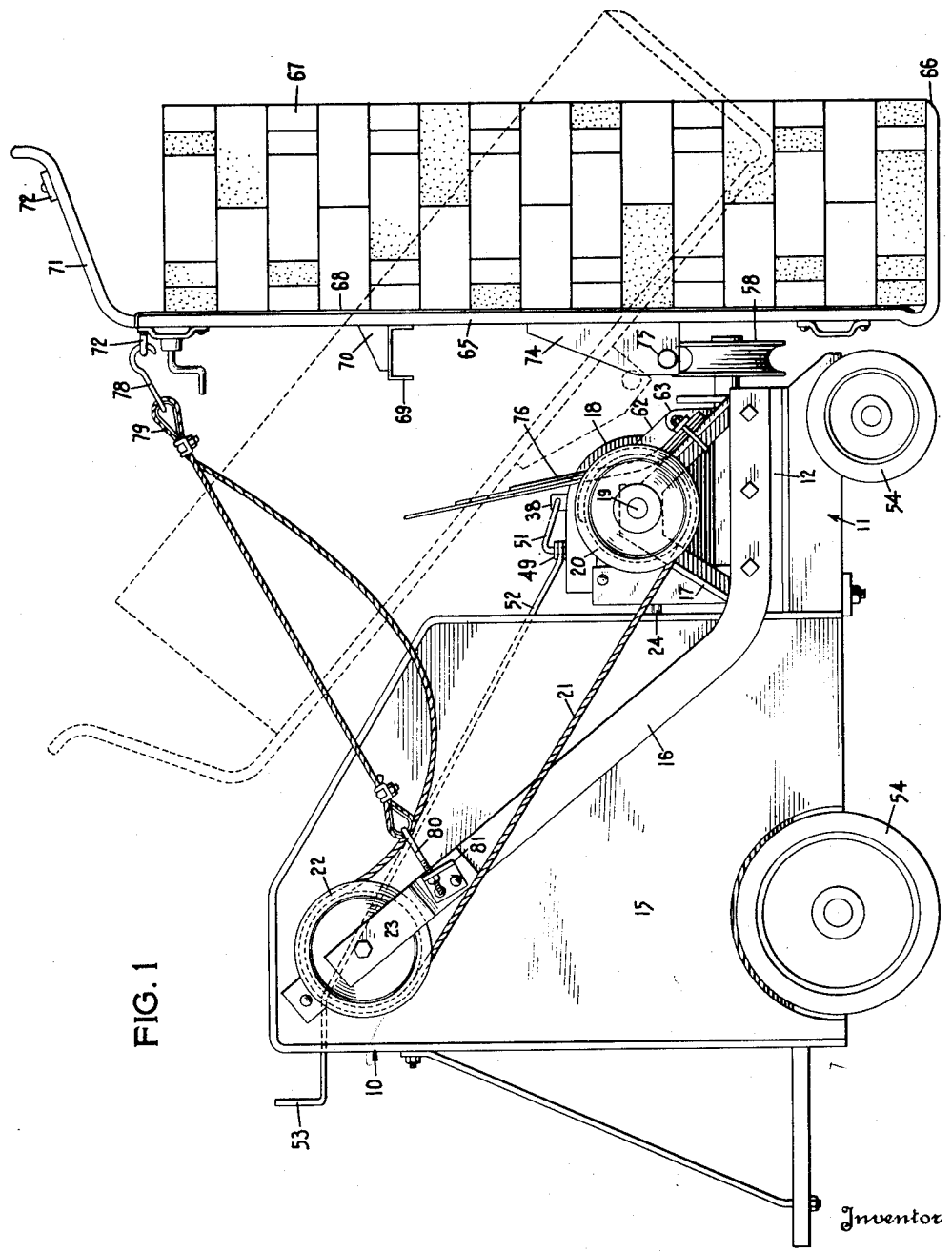
FIG. 1
Inventor
Robert A. Fontaine
Attorney March 15, 1932.  R. A. FONTAINE  1,849,424
BRICK HANDLING TRUCK
Filed April 15, 1929  4 Sheets-Sheet 2

Inventor
Robert A. Fontaine
By
Attorney

March 15, 1932.  R. A. FONTAINE  1,849,424
BRICK HANDLING TRUCK
Filed April 15, 1929  4 Sheets-Sheet 3
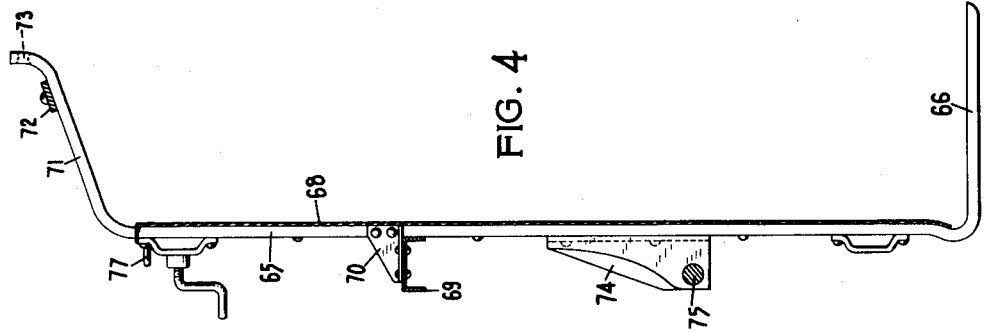
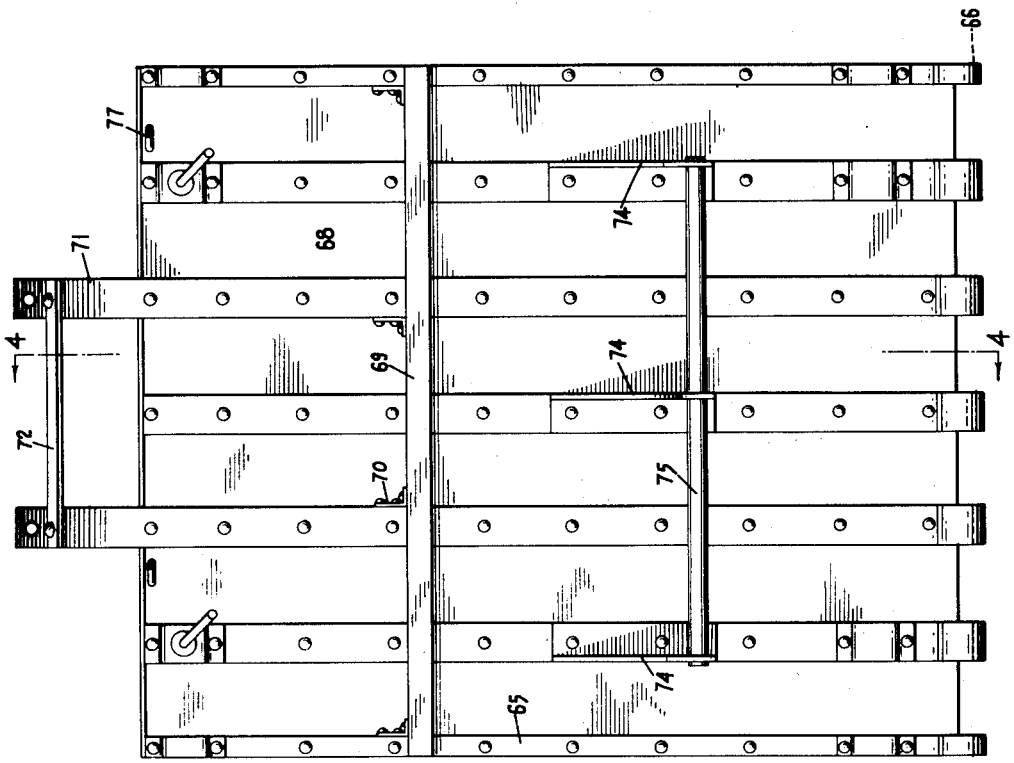
Inventor
Robert A. Fontaine March 15, 1932. R. A. FONTAINE 1,849,424
BRICK HANDLING TRUCK
Filed April 15, 1929 4 Sheets-Sheet 4

Inventor
Robert A. Fontaine
By
Attorney

Patented Mar. 15, 1932

1,849,424

UNITED STATES PATENT OFFICE

ROBERT A. FONTAINE, OF MARTINSVILLE, VIRGINIA

BRICK HANDLING TRUCK

Application filed April 15, 1929. Serial No. 355,326.

The invention relates to apparatus for handling bricks or the like in stack or hack form.

The principal object of the invention, generally stated, is to provide a truck device by means of which a stack of bricks may be moved bodily from place to place without disturbing the arrangement or form.

A very important feature of the invention is the provision of a truck of this character of such construction that the stack of bricks carried thereby may be deposited close in a corner or close against the wall and particularly close to the side of a car being loaded.

A more specific object of the invention is to provide a truck having a brick stack carrying body shiftable laterally for the purpose of clearing an obstruction during travel and for the purpose of permitting the load to be shifted laterally to deposit it close against the wall of a building, the side of a car or another stack of bricks which has been previously deposited.

More particularly considered, an object of the invention is to provide the combination of an industrial tractor or truck device and a brick stack carrying body detachable therefrom for hoisting purposes and movably mounted thereon to be capable of limited vertical movement for initially lifting or for ultimately depositing the bricks, also capable of tilting movement to support the stack of bricks in inclined position during travel, and capable of lateral movement for bringing the stack close to an adjoining stack, wall, car side or the like or to avoid an obstruction.

Another object of the invention is to provide an operating mechanism driven by the power unit of the truck or tractor and connected with the movable and removable body for raising and lowering the latter and for tilting it into and then out of inclined position.

The invention further contemplates the provision of an automatic stop mechanism so that excessive movement of the parts will be prevented in case of carelessness on the part of the operator.

Another object of the invention is to provide a device of the character specified which may be used in conjunction with a truck equipped with a windlass mechanism constructed and arranged as in my prior Patent No. 1,637,338, granted August 2, 1927, the present invention therefore being capable of being considered as an attachment to an existing industrial truck embodying said patented structure.

An additional object of the invention is to provide an apparatus of this character which will be comparatively simple and inexpensive to manufacture, very easy to operate, positive in action, efficient and durable in service, and a general improvement in the art.

Figure 8:
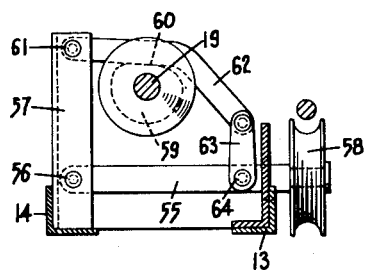
Figure 9:
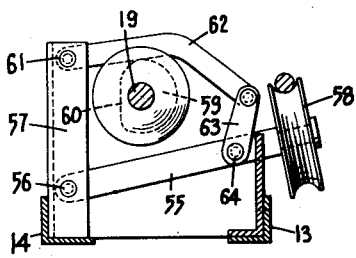
Figure 7:
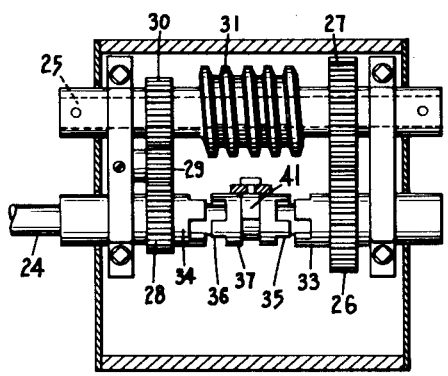
Figure 5:
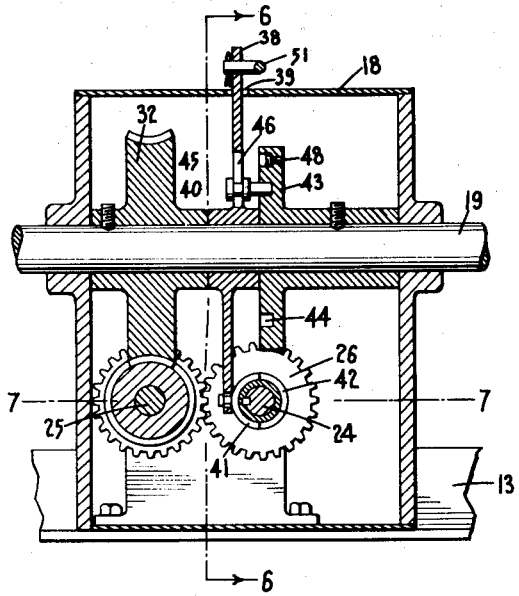
Figure 6:
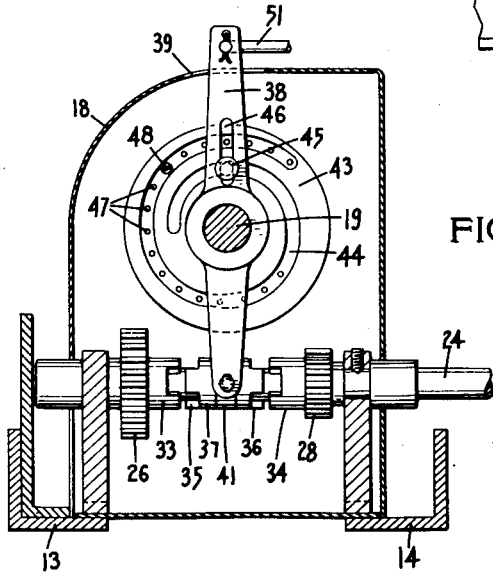

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of the complete device, showing the combination of the truck and brick carrying body, the normal position being shown by full lines and the elevated and tilted position by dotted lines, Figure 2 is a top plan view, Figure 3 is a rear elevation of the brick carrying body, Figure 4 is a vertical cross section therethrough taken on the line 4—4 of Figure 3, Figure 5 is a sectional view taken on the line 5—5 of Figure 2 and showing the drive mechanism, Figure 6 is a cross section taken on the line 6—6 of Figure 5, Figure 7 is a sectional view taken on the line 7—7 of Figure 5, this view being turned at right angles, Figure 8 is a cross sectional view taken on the line 8—8 of Figure 2 with the parts shown in the normal or lowered position of the body, and Figure 9 is a similar view showing the position of the parts when the body is lifted.

Referring more particularly to the drawings the numeral 10 designates, generally, an industrial truck such as is or may be used more or less commonly around brick yards and the like. This truck embodies numerous, if not all, features disclosed in my prior Patent No. 1,637,338, and in addition thereto includes various other features which enable it to be used in the combination forming the subject matter of this application. Notwithstanding the disclosure of many of the features in said patent, a practically full and complete description thereof, as well as illustration, is embodied in this application for the sake of clearness, the particular details referred to being those shown in Figures 5, 6 and 7. This truck includes a frame 11 which may be formed of any desired or necessary number of structural elements not shown in minute detail as they do not constitute the essence of the invention. It is thought sufficient to say that this frame includes side bars 12 and transverse bars 13 and 14 connected therewith. The truck also includes a casing 15 mounted on the frame and enclosing a power unit of some suitable type, for example an electric motor and storage battery, both of which are not shown. This casing is braced by angular bars 16 connected with the end bars 12.

Mounted on the frame as by being secured to the bars 13 and 14 are upstanding bearing brackets 17 between which is a housing 18. Journaled through the bearing brackets 17 is a shaft 19 extending through the housing 18 and equipped at its ends with winding drums 20 to which are secured and about which may be wound cables 21 which are trained over pulleys 22 carried by the bars 16 and journaled between the latter and offset brackets 23 secured thereto. These cables will be again referred to later and their function described.

The transmission mechanism for driving the shaft 19 and consequently turning the drums 20 in one direction or the other comprises the following parts: Journaled in the housing 18 beneath the shaft 19 and at right angles thereto is a drive shaft 24 and a countershaft 25, the former extending into the casing 15 and being driven by whatever means is provided for the purpose, such for example as the electric motor above referred to. This is, however, immaterial as it is readily apparent that the shaft 24 might be driven by means of a gasoline engine or the like. Within the housing the shaft 24 carries a gear 26 rotatable thereon meshing with a gear 27 fast on the shaft 25 for driving the latter in one direction. The shaft 24 also carries a gear 28 rotatable thereon meshing with an idler gear 29 which in turn meshes with a gear 30 fast on the shaft 25 so that the latter may be driven in the reverse direction. The shaft 25 also carries a worm 31 engaging a worm wheel 32 on the shaft 19 within the housing 18. On the confronting faces of the gears 26 and 28 are clutch members 33 and 34, respectively, adapted to be engaged by clutch faces 35 and 36 on a sleeve 37 splined upon the shaft 24 and therefore rotatable therewith. The transmission mechanism further includes a clutch shifting lever 38 which has its upper end projecting through a slot 39 in the housing 18. Intermediate its ends this lever has a hub portion 40 rotatably engaged upon the shaft 19. The lower end of this lever carries an arcuate shoe 41 engaging within a groove 42 in the sleeve 37. Clearly, by moving the lever 38 in one direction the clutch faces 36 and 34 will engage and by moving it in the opposite direction the clutch faces 35 and 33 will engage for locking the gear 28 or the gear 26 onto the shaft 24 and thereby driving the shaft 25 and consequently the shaft 19 in one direction or the other.

In this type of truck it is intended that the rotation of the shaft 19 be stopped after it has made a certain number of turns. For this reason I have shown a disk 43 fast on the shaft 19 and formed in one face with a spiral groove 44 within which rides a pin 45 carried by the lever 38 and movable along a longitudinal slot 46 therein. At the bottom of the groove 43 is provided a series of threaded holes 47 within any selected one of which may be placed a stop screw 48 adapted to engage against the pin 45 after the disk 43 has made a predetermined number of revolutions, it being clear that the pin 45 will move along the lever 38 and it being equally clear that when this screw engages the pin 45 the lever 38 will be shifted laterally for throwing the clutch device into neutral position, thereby stopping rotation of the shaft 19 and drums 20 thereon. If it is not desired to make use of this automatic clutch throw-out device the pin 45 may be removed whereupon the clutch must be controlled manually alone. The manual control means is shown as comprising a lever 49 pivoted at 50 on the housing 18 and connected at one end by a link 51 with the projecting upper end of the lever 38, and having connected with its other end a rod 52 which extends rearwardly of the truck and which terminates behind the casing 15 in an upturned end 53 constituting a handle. It will be seen that the clutch is of course intended to be operated manually for throwing it into forward or reverse and it may also be thrown into neutral manually unless it is preferred to make use of the automatic throw-out mechanism involving the employment of the pin 45 and screw 48.

The entire truck is mounted upon suitable wheels 54 so as to be readily transportable and in the actual commercial construction some suitable transmission mechanism is provided between the power unit in the casing 15 and the wheels 54 for propelling purposes. There would also necessarily be provided a steering gear. However, all of these details have no bearing on the invention itself and they are therefore not illustrated. Trucks constructed in this manner are already in actual service for hoisting and hauling purposes, particularly around brick yards. Nevertheless, the foregoing description is necessary to a complete understanding of the present invention.

In carrying out the present invention or in adapting it to the truck shown and described, either as an attachment thereto or as a unitary part thereof during initial construction, I provide arms 55 pivoted at 56 on upright brackets 57 mounted on the frame bar 14. The arms 55 project forwardly beyond the frame bar 13 and carry rotatably mounted grooved rollers 58 which constitute the supporting means for the brick carrying body to be described. As the arms 55 and rollers 58 constitute the support for the brick stack carrying body and as this body is to be raised and lowered, it becomes necessary to provide mechanism for raising and lowering the arms 55. As a consequence, I equip the shaft 19 with cams 59 having substantially flat areas 60. Pivoted at 61 on each of the uprights 57 is an arm 62 overlying and engaging upon the adjacent cam 59 and carrying a pivoted link 63 pivotally connected at 64 with the associated arm 55. It will be observed that the cams are flanged to prevent the arms 62 from slipping off laterally. The degree of lift of the brick body, to be described, resulting from the upward movement of the arms 55 carrying the rollers 58 is naturally greater than the difference between the distance from the axis of the cam to the flat spot and the distance from the axis to the highest spot as the arm and link mechanism will have an amplifying or magnifying effect.

The brick body is shown as comprising a series of L-shaped bars 65, the lower ends of which, represented at 66, constitute lifting fingers for engagement beneath a stack 67 of bricks, it being obvious that the stack must be supported upon either a pallet beneath which these fingers may engage, or upon wooden blocks or else rows of other bricks in such manner that the fingers 66 may enter beneath the stack and between such supports in accordance with a system well understood in the art. The back of the body is formed by one or more sheet metal plates 68 riveted to the bars 65. Reinforcement is effected by means of one or more transverse bars 69 which are in turn strengthened by angular braces 70. As the brick body is intended to be removable with respect to the truck and as it may be necessary to move it about by means of a crane, derrick or the like, certain of the bars 65 are shown as prolonged upwardly at 71 and inclined forwardly, with the end portions strengthened by a transverse bar 72 and with the extremities apertured at 73 for the engagement of hoisting hooks or the like therewith. To adapt this body, which could be used of course for general purposes for holding a stack intact, for use with the above described truck, I provide brackets 74 on certain of the bars 65, which brackets have extending therethrough a rod 75 adapted to seat upon the grooved rollers 58 whenever the body is connected with the truck.

As it is intended that the brick carrying body be arranged in tilted position, as shown by dotted lines in Figure 1, when a stack of bricks is being carried about from place to place, and as it is necessary to cushion the shock when the loaded body is tilted back and as it is furthermore very desirable to avoid jarring or shaking the stack of bricks during transportation, I provide leaf springs 76 secured upon the truck at some suitable place, for example upon the brackets 17, these springs being engaged by the back of the body and resiliently supporting the same and its load. At some suitable points near its upper edge the brick carrying body is provided with eyes or other attaching elements 77 within which are engaged hooks 78 mounted in loops 79 on the cables 21. One end of each cable is anchored as by an eye bolt 80 secured to a bracket 81 on the angular bar 16. It has already been mentioned that the other end of each cable is secured to and adapted to be wrapped about the associated drum 20. The intermediate portion of each cable is trained over the pulley 22 with a certain amount of slack left between the pulley 22 and the loop 79.

Assuming that the truck and brick carrying body have been constructed as above described, the operation is as follows: Initially, the brick body is set in upright position upon the floor or ground. To effect connection with the truck, the truck is driven or otherwise moved to a position at the rear of the body with the grooved rollers 58 beneath the transverse rod 75 on the back of the truck body. The operator then grasps the handle 53 and moves the rod 52 so as to swing the lever 49 on its pivot 50, and moves the link 51 to shift the lever 38 and consequently move the clutch sleeve 37 to engage the face 35 thereon with the clutch face 33. Rotation of the shaft 24 by whatever power means is provided will then be communicated to the gear 26 and through the gear 27 to the shaft 25. The worm 31 on the shaft 25 will drive the worm wheel 32 and cause rotation of the shaft 19. As the shaft 19 turns, the drums 20 thereon will also turn and will wind in a portion of the slack in the cable 21. The rotation of the shaft 19 is intended to be only partial, at this time, so that the cams 59 will move out of the position shown in Figure 8 with their flat spots 60 engaging beneath the arms 62 toward the high part. The arms 62, and consequently the arms 55, are thereby moved upwardly and the grooved rollers 58 will engage beneath the transverse rod or bar 75. As the rotation of the cams continues, the arms 62 and 55 will be raised still more, the maximum height being reached when the highest points of the cams 59 engage beneath the arms 62. This upward movement of the arms 55 and rollers 58 will lift the entire brick carrying body which remains at this time in vertical position as its tendency is to tip forwardly and as this tendency is counteracted by the taut stretch of the cable between the loop 79 and eye bolt 80. The truck may then be propelled to the place where there is standing a stack of bricks to be moved, the stack standing upon bars or wood or the like or auxiliary bricks spaced apart to permit the introduction of the lifting fingers 66. When it is desired to engage the brick body with the stack, the handle 53 should be manipulated to shift the clutch 38 into the other position so that the clutch faces 34 and 36 will engage to rotate the shaft 25 and consequently the shaft 19 in a direction opposite to that already described so that the arms 62 and 55 may move downwardly to a certain extent to permit the fingers 66 to enter beneath the stack 67 until the back sheet 68 of the body engages thereagainst. The clutch is again thrown in the first mentioned direction so that the arms 55 and rollers 58 will lift the body and stack substantially vertically a few inches off the ground or floor. The high part of the cams 59 extends throughout the major portion of the periphery so that the brick carrying body and stack will be held in elevated position while the shaft 19 completes, or substantially completes, its rotation. The drums 20 will, during this rotation, wind up on the cables 21 and not only take out all the slack therein but apply a rearward pull at the top of the body. This pull is sufficient to draw the body rearwardly against gravity until it comes to rest upon the springs 76. This position is shown by dotted lines in Figure 1 and the truck may be propelled to carry the stack to wherever it is to be deposited. As the rod 75 is of considerably greater length than the distance between the rollers 58, the body, carrying the stack, may be shifted laterally, the rollers 58 turning beneath the rod 75. This lateral shifting permits dodging and obstruction in the path of travel of the truck and stack. Furthermore, this lateral shifting makes it possible for the operator to move the body and stack close to a wall, side of a car or adjacent stack in order to save space and make the load or assemblage of stacks sufficiently compact that jarring, as for example in a freight car, will not disarrange the stacks. Having reached the desired position, the operator manipulates the handle 53 and thereby the clutch 38 to reverse the direction of rotation of the shaft 19. The cable then unwinds from the drums 20 and this permits the body and stack to gravitate into a vertical position. With the stack in its vertical position the truck may be manipulated back or forth, as the case may be, to position the stack accurately with respect to its surroundings. The absolutely proper position having been reached, the shaft 19 is caused to rotate additionally in a direction to bring the flat spots of the cams beneath the arms 62, the arms 62 and 55 moving downwardly at this time until they reach their lowermost positions whereupon the rollers will be below the rod 75, permitting the truck to be backed away of course after the hooks 78 are unhitched or disconnected. When the stack is thus deposited it must be placed upon bars, bricks or other means for spacing it above the floor or ground so that the fingers may be withdrawn. When the truck is detached from the body, the body may of course be hoisted by means of a crane, derrick or the like in the manner above indicated.

From the foregoing description and a study of the drawings it will be apparent that I have thus provided a very efficient combination for handling stacks of bricks and for depositing them close to other stacks, walls, car sides, etc. without wasted space. Owing to the provision of power, the work can be carried on expeditiously and with remarkably little effort. The apparatus will consequently be a great labor saving device and will speed up the work of moving cars, etc. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a brick handling apparatus, the combination of a wheeled truck, pivoted supporting members carried thereby, a brick stack engaging body, track means on said body removably connected with said supporting members, and means for raising and lowering said supporting members, the body being movable laterally with respect to the truck when in raised position.

2. In a brick handling apparatus, the combination of a wheeled truck, supporting members carried thereby carrying rollers, a brick stack engaging body, track means on the rear of said body removably engageable with the rollers on said supporting members, power operated means for raising and lowering said supporting members, and means on the truck engageable with the body for tilting the same rearwardly, the body being slidable transversely with respect to the truck when in raised position.

3. In a brick handling apparatus, the combination of a wheeled truck, supporting members carried thereby, a brick stack engaging body, track means on said body removably engageable with said supporting members, means for raising and lowering said supporting members, means on the truck engageable with the body for tilting the same selectively forwardly or rearwardly, and cushioning means on the truck comprising a series of leaf springs anchored at one end to the truck and having the other end engageable by the body for resiliently supporting the same in tilted position and limiting rearward movement.

4. A brick handling device comprising the combination of a wheeled truck, supporting arms thereon equipped with rollers, a brick stack engaging body, track means on said body engageable by the rollers on said arms, cam means on the truck for moving said arms upwardly and downwardly, and means on the truck connected with the body for preventing the same from moving forwardly beyond a substantially vertical position, said body being movable laterally with respect to the truck upon said supporting arms.

5. In a brick handling apparatus, the combination of a wheeled truck, forwardly extending arms pivoted thereon and carrying rollers, a brick stack engaging body having portions to engage beneath a stack, a member on the rear of the body adapted to be engaged by said grooved rollers and movable thereover so that the body may be moved laterally with respect to the truck, and means for swinging said arms upwardly and downwardly to raise and lower the body.

6. In a brick handling apparatus, the combination of a wheeled truck, forwardly extending arms pivoted thereon and carrying grooved rollers, a brick stack engaging body having portions to engage beneath a stack, a track member on the rear of the body adapted to be engaged by said grooved rollers, and means for swinging said arms upwardly and downwardly to raise and lower the body, the body being shiftable laterally with respect to the truck and the track member thereon travelling over said rollers 7. A brick handling device comprising the combination of a wheeled truck, arms pivoted thereon and carrying rollers, a body adapted to be disposed against a stack of bricks and having lifting fingers to extend beneath the stack, a track member on said body engageable by said grooved rollers, power operated cam means on the truck for swinging said arms upwardly and downwardly to raise or lower the body, means on the truck operating subsequently to the lifting action of the arms for tilting the body rearwardly, and flexible means for limiting the tilting movement.

8. A brick handling device comprising the combination of a wheeled truck, arms pivoted thereon and carrying rollers, a body adapted to engage a stack of bricks, a member extending transversely of the back of the body, means for moving said arms upwardly to engage the rollers beneath said member and to lift the body, windlass means on the truck for tilting the body rearwardly when in lifted position, and flexible means on the truck for limiting movement of the body forwardly into substantially vertical position, said arms being movable downwardly to deposit the stack.

9. A brick handling apparatus comprising the combination of a wheeled truck, arms movably mounted thereon and carrying rollers, a shaft on the truck, means on the shaft engaging said arms for moving the same upwardly and downwardly, means for driving said shaft in a selected direction, a body engageable with a stack of bricks with portions extending beneath the stack, a member on said body adapted to be engaged by said arms whereby the body may be raised and lowered, and means operated by rotation of said shaft and connected with the body for swinging the same rearwardly and forwardly.

10. A brick handling apparatus comprising the combination of a wheeled truck, arms movably mounted thereon and carrying rollers, a shaft on the truck, means on the shaft engaging said arms for moving the same upwardly and downwardly, means for driving said shaft in a selected direction, a body engageable with a stack of bricks with portions extending beneath the stack, a member on said body adapted to be engaged by said arms whereby the body may be raised and lowered, and means operated by rotation of said shaft and connected with the body for swinging the same rearwardly and forwardly, said member being of greater length than the distance between the arms whereby the body may be moved laterally upon the arms when in raised position.

11. A brick handling apparatus comprising the combination of a wheeled truck, a shaft rotatably mounted thereon, arms movably mounted on the truck, a body having portions engageable beneath a stack of bricks, means on said body engageable by said arms, cam means on said shaft for raising and lowering said arms to lift and lower the body, drums on said shaft, and cables secured to and engaged about said drums, trained over guide pulleys and connected with the body for tilting the same rearwardly and forwardly when the body is raised and lowered respectively.

12. A brick handling apparatus comprising the combination of a wheeled truck, a shaft rotatably mounted thereon, arms movably mounted on the truck, a body having portions engageable beneath a stack of bricks, means on said body engageable by said arms, cam means on said shaft for raising and lowering said arms to lift and lower the body, drums on said shaft, and cables secured to and engaged about said drums, trained over guide pulleys and connected with the body for tilting the same rearwardly and forwardly when the body is raised and lowered respectively, said arms being equipped with rollers whereby said means on the body may travel therealong and permit lateral shifting of the body with respect to the truck.

13. A brick handling apparatus comprising the combination of a wheeled truck, a shaft rotatably mounted thereon, arms movably mounted on the truck, a body having portions engageable beneath a stack of bricks, means on said body engageable by said arms, cam means on said shaft for raising and lowering said arms to lift and lower the body, drums on said shaft, cables secured to and engaged about said drums, trained over guide pulleys and connected with the body for tilting the same rearwardly and forwardly when the body is raised and lowered respectively, a transmission mechanism connected with said shaft for rotating the same, and control means for the transmission whereby the shaft may be driven in one direction or the other.

14. A brick handling apparatus comprising the combination of a wheeled truck, a shaft rotatably mounted thereon, arms movably mounted on the truck, a body having portions engageable beneath a stack of bricks, means on said body engageable by said arms, cam means on said shaft for raising and lowering said arms to lift and lower the body, drums on said shaft, and cables secured to and engaged about said drums, trained over guide pulleys and connected with the body for tilting the same rearwardly and forwardly when the body is raised and lowered respectively, said cam means operating initially to lift the arms and body and maintaining the body in elevated position during additional rotation of the drums to effect the tilting.

15. A brick handling apparatus comprising the combination of a wheeled truck, a body, swingable arms on the truck engageable with the body for raising and lowering the same, power operating cam means engaging said arms for moving the same, a windlass device on the truck connected with the body for tilting the same rearwardly when in raised position, a flexible member carried by the truck and detachably connected with the body for limiting the forward tilting thereof, and spring means on the truck engageable by the body for limiting rearward tilting thereof.

16. In a brick handling apparatus, the combination of a wheeled truck, pivoted supporting members carried thereby, means for raising and lowering said supporting members, a brick stack engaging body, and coacting means on said body and supporting members for removably mounting the former upon the latter and enabling the former to move laterally with respect to the latter when said supporting members are in raised position.

17. In an article handling apparatus, the combination of a wheeled truck, supporting members permanently carried thereby, means for raising and lowering said supporting members, a stack engaging body, and coacting means on said body and supporting members for detachably connecting the same and for enabling the body to have rectilinear movement laterally when said supporting members are in raised position.

In testimony whereof I affix my signature.

ROBERT A. FONTAINE.